(12) United States Patent
Strayer et al.

(10) Patent No.: US 10,742,024 B2
(45) Date of Patent: Aug. 11, 2020

(54) SELECTABLE INPUT TRANSIENT VOLTAGE SUPPRESSOR

(71) Applicant: Continental Automotive Systems, Inc., Auburn Hills, MI (US)

(72) Inventors: Lance Ronald Strayer, Clarkston, MI (US); Daniel William Shafer, Mussey Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/398,111

(22) Filed: Apr. 29, 2019

(65) Prior Publication Data

US 2019/0252876 A1    Aug. 15, 2019

Related U.S. Application Data

(62) Division of application No. 15/140,959, filed on Apr. 28, 2016, now Pat. No. 10,277,028.

(51) Int. Cl.
| | |
|---|---|
| *H02H 3/20* | (2006.01) |
| *H02H 9/04* | (2006.01) |
| *H02H 9/00* | (2006.01) |
| *B60R 16/03* | (2006.01) |
| *G05F 1/625* | (2006.01) |

(52) U.S. Cl.
CPC .......... *H02H 9/042* (2013.01); *B60R 16/03* (2013.01); *G05F 1/625* (2013.01); *H02H 9/005* (2013.01); *H02H 9/04* (2013.01); *H02H 9/041* (2013.01); *H02H 9/043* (2013.01)

(58) Field of Classification Search
CPC .......... H02H 9/00; H02H 9/042; H02H 9/043; H02H 9/005; H02H 9/04; H02H 9/041; B60R 16/03; G05F 1/625
See application file for complete search history.

(56) References Cited

U.S. PATENT DOCUMENTS

| | | | |
|---|---|---|---|
| 5,379,178 A | * | 1/1995 | Graf ........................ F02D 41/20 123/490 |
| 6,727,555 B2 | | 4/2004 | Heinisch et al. |
| 8,179,653 B2 | | 5/2012 | Gerlach |
| 9,671,453 B2 | | 6/2017 | Hess |
| 9,671,456 B2 | | 6/2017 | Weizman |

(Continued)

FOREIGN PATENT DOCUMENTS

DE    102008041099 A1    2/2010

OTHER PUBLICATIONS

International Search Report and Written Opinion dated Jul. 27, 2017 from corresponding International Patent Application No. PCT/US2017/028616.

(Continued)

*Primary Examiner* — Rexford N Barnie
*Assistant Examiner* — Rasem Mourad

(57) ABSTRACT

An electrical system includes an input node electrically connectable to a power supply. The system includes a plurality of voltage suppressors, with at least one of the voltage suppressors electrically connected to the input node. A voltage selection switch is electrically connected to at least one of the plurality of voltage suppressors. A controller in communication with the switch may selectively operate the switch based on a nominal operating voltage at the input node.

17 Claims, 3 Drawing Sheets

(56) References Cited

U.S. PATENT DOCUMENTS

| | | |
|---|---|---|
| 2011/0279940 A1 | 11/2011 | Xu |
| 2012/0165816 A1* | 6/2012 | Kersten .............. A61B 18/1233 |
| | | 606/45 |
| 2012/0250205 A1 | 10/2012 | Pfitzer et al. |
| 2014/0167727 A1* | 6/2014 | Bridge .................. H02J 7/0031 |
| | | 323/311 |
| 2015/0104886 A1 | 4/2015 | Weizman et al. |
| 2015/0162754 A1 | 6/2015 | Nakano et al. |
| 2017/0187181 A1* | 6/2017 | Kashyap ................ H02H 9/005 |

OTHER PUBLICATIONS

Chinese Office Action dated May 24, 2019 for corresponding Chinese patent application No. 201780026094.1.
Chinese Second Office Action dated Oct. 9, 2019 for corresponding Chinese patent application No. 201780026094.1.
Korean Notice to Submit Response dated Mar. 26, 2020 for the counterpart Korean Patent Application No. 10-2018-7030690.
Notification to Grant Patent Right for Invention, dated Mar. 6, 2020 for counterpart China patent application 201780026094.1.

* cited by examiner

US 10,742,024 B2

SELECTABLE INPUT TRANSIENT VOLTAGE SUPPRESSOR

CROSS-REFERENCE TO RELATED APPLICATION

The present application is a divisional application and claims the benefit of U.S. patent application Ser. No. 15/140,959, filed Apr. 28, 2016, the content of which is hereby incorporated by reference in its entirety.

TECHNICAL FIELD

The technical field is generally related to voltage suppression for electrical systems.

BACKGROUND

Vehicles, such as automobiles, often implement various electrical systems. For instance, these systems may include various controllers such as engine control modules, lighting, audio systems, etc. While many vehicles utilize a 12 volt ("V") power supply, such as a battery, other vehicles may utilize power supplies operating at different voltages, e.g., 24 V. However, the various components in these electrical systems have similar functionality no matter the selected operating voltage of the power supply.

As such, it is desirable to present an electrical system that can be used with different input voltages. It is also desirable to present an electrical system with voltage suppression that can be used with different input voltages. In addition, other desirable features and characteristics will become apparent from the subsequent summary and detailed description, and the appended claims, taken in conjunction with the accompanying drawings and this background.

BRIEF SUMMARY

In one exemplary embodiment, an electrical system includes an input node electrically connectable to a power supply. The system includes a plurality of voltage suppressors. At least one of the plurality of voltage suppressors is electrically connected to the input node. The system also includes a voltage selection switch electrically connected to at least one of the plurality of voltage suppressors. The system further includes a controller in communication with the switch to selectively operate the switch based on a nominal operating voltage at the input node.

In one exemplary embodiment, a method of operating an electrical system, includes determining a voltage at an input node. The method also includes selectively operating a voltage selection switch electrically connected to at least one of a plurality of voltage suppressors in response to determining the voltage at the input node.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
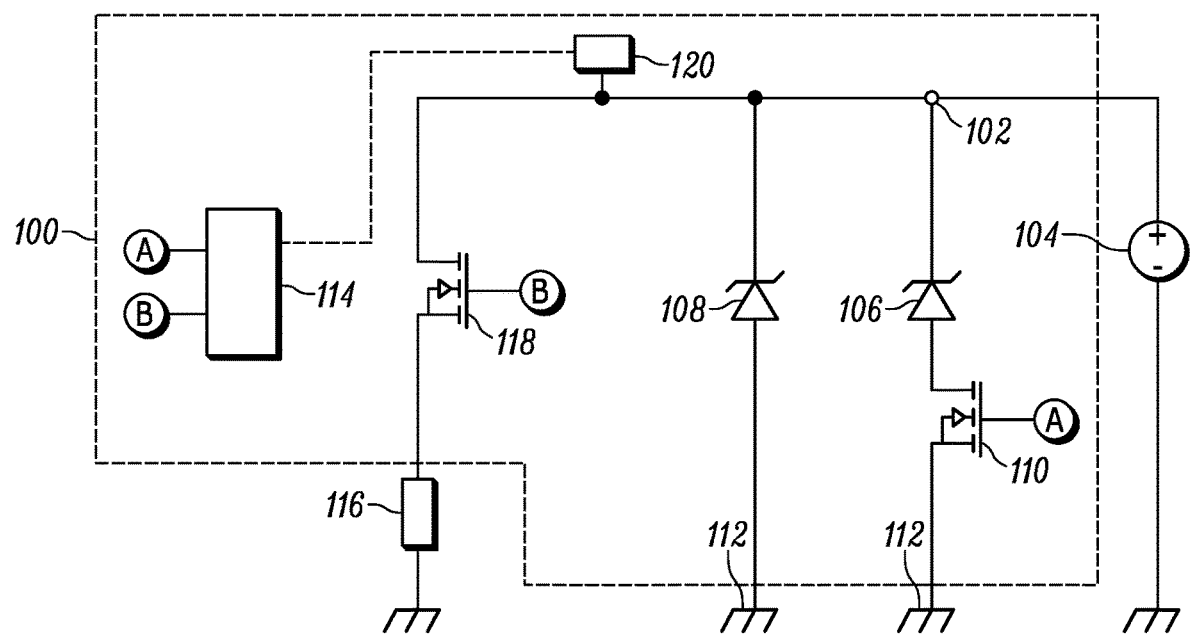
FIG. 1 is an electrical schematic diagram of an electrical system according to an exemplary embodiment with a plurality of voltage suppressors arranged generally in parallel.

Referring to the Figures, wherein like numerals indicate like parts throughout the several views, an electrical system 100 is shown and described herein.

In one exemplary embodiment, the electrical system 100 may be implemented as part of a vehicle (not shown), e.g., an automobile (not shown). More particularly, the electrical system 100 may be implemented as part of an engine control module (not shown) of the vehicle. However, it should be appreciated that the electrical system 100 may be implemented in numerous other applications other than the engine control module and/or the vehicle.

Some or all of the components of the electrical system 100 described herein may be supported by one or more circuit boards (not shown). As appreciated by those skilled in the art, the circuit board may provide electrical connections via conductive traces between the various components.

The electrical system 100 includes an input node 102. The input node 102 is electrically connectable to a power supply 104. In the exemplary embodiment, the power supply 104 provides direct current ("DC") power, which is received at the input node 102. The power supply 104 may provide DC power at one or more voltage levels. For instance, in one exemplary embodiment, the power supply 104 provides DC power at 12 volts ("V"). In another exemplary embodiment, the power supply 104 provides DC power at 24 V. Of course, the DC power supplied by the power supply 104 may be at any appropriate voltage level. The power supply 104 may be include a battery (not separately shown), a capacitor (not separately shown), and/or a solar cell (not separately shown). Of course, those skilled in the art will appreciate other devices and/or techniques to implement the power supply 104.

The electrical system 100 further includes a plurality of voltage suppressors 106, 108, 200, 202. The voltage suppressors 106, 108, 200, 202 may be referred to as transient voltage suppressors 106, 108, 200, 202 as appreciated by those skilled in the art. As also appreciated by those skilled in the art, the transient voltage suppressors 106, 108, 200, 202 are configured to react to overvoltage conditions, voltage spikes, etc., to protect other devices (not separately numbered) of the electrical system 100. The transient voltage suppressors 106, 108, 200, 202 may be diodes, varistors, gas discharge tubes, and/or other suitable devices.

In the exemplary embodiments, at least one of the plurality of voltage suppressors 106, 108, 200, 202 is electrically connected to the input node 102. In the embodiment shown in FIG. 1, a first transient voltage suppressor 106 and a second transient voltage suppressor 108 are each electrically connected to the input node 102. More particularly, a cathode (not numbered) of each transient voltage suppressor 106, 108 is electrically connected to the input node 102.

The electrical system 100 also includes a voltage selection switch 110 electrically connected to at least one of the plurality of voltage suppressors 106, 108, 200, 202. In the embodiment shown in FIG. 1, the voltage selection switch 110 is electrically connected to the first transient voltage suppressor 106. More particularly, the voltage selection switch 110 is electrically connected between an anode (not numbered) of the first transient voltage suppressor 106 and a ground 112.

In the exemplary embodiment shown in FIG. 1, the voltage selection switch 110 is implemented a transistor (not separately numbered), and more specifically a metal-oxide-semiconductor field-effect transistor ("MOSFET") (not separately numbered). However, it should be appreciated that other devices may be utilized to implement the voltage selection switch 110.

As can be seen in FIG. 1, the second voltage suppressor 108 is always in electrical connection between the input node 102 and the ground 112, while the first voltage suppressor 108 is only in electrical connection between the input node 102 and the ground when the voltage selection switch 110 is active, i.e., "closed".

In the embodiment shown in FIG. 1, the first voltage suppressor 106 exhibits a first clamping voltage. More specifically, in this exemplary embodiment, the first voltage suppressor 106 has a clamping voltage, i.e., a standoff voltage, of about 26 V. The second voltage suppressor 108 exhibits a second clamping voltage less than the first clamping voltage. More specifically, in this embodiment, the second voltage suppressor 108 has a clamping voltage of about 43 V.

The electrical system 100 further includes a controller 114. The controller 114 may utilize a microprocessor, microcontroller, application specific integrated circuit ("ASIC"), and/or other device for controlling operation of the electrical system 100, performing calculations, and/or executing instructions (i.e., running a program). The controller 114 may also utilize a memory (not shown) for storing instructions and/or data. The memory may be implemented with transistors, a hard disk, an optical disk, and/or any other suitable storage device as appreciated by those skilled in the art.

The controller 114 is in communication with the voltage selection switch 110 to selectively operate the switch 110 based on a nominal operating voltage of the power supply 104 and/or at the input node 102. As on example, as shown in the embodiment of FIG. 1, when the power supply 104 voltage is 12 V, the voltage selection switch 110 is activated, i.e., closed, by the controller 114. As such, the first transient voltage suppressor 106 clamps the input voltage to 26 V. When the power supply 104 voltage is 24 V, the voltage selection switch 110 is deactivated, i.e., opened. Accordingly, the first transient voltage suppressor 106 is disconnected, so the second transient voltage suppressor 108 clamps the input voltage to 43 V.

Figure 2:
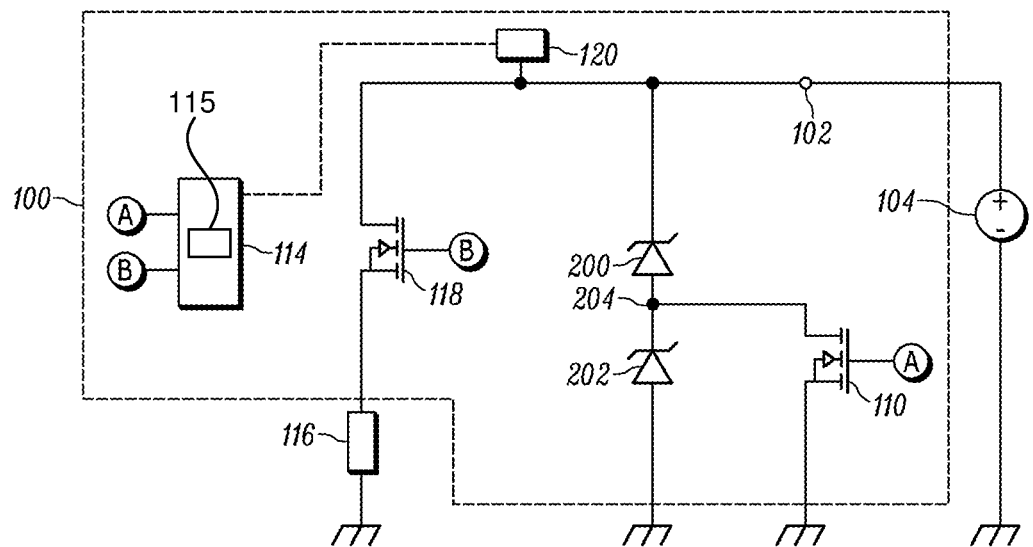
FIG. 2 is an electrical schematic diagram of the electrical system according to an exemplary embodiment with the plurality of voltage suppressors arranged generally in series.

In another exemplary embodiment, as shown in FIG. 2, the plurality of voltage suppressors 106, 108, 200, 202 is implemented with a first voltage suppressor 200 and a second voltage suppressor 202 electrically connected in series between the input node 102 and ground 112. In this embodiment, the voltage selection switch 110 is electrically connected between the ground 112 and a node 204 between the voltage suppressors 200, 202.

In this exemplary embodiment, the first voltage suppressor 200 exhibits a clamping voltage of about 22 V while the second voltage suppressor 202 exhibits a clamping voltage of about 20 V. More particularly, in this exemplary embodiment the first voltage suppressor 200 is implemented with a model No. SM8S22A and the second voltage suppressor 202 is implemented with a model No. SM8S20A, both manufactured by Vishay Intertechnology, Inc. of Shelton, Conn. Of course, in other embodiments, the voltage suppressors 200, 202 may be implemented with other devices, as appreciated by those skilled in the art.

In the embodiment shown in FIG. 2, the first and second voltage suppressors 200, 202 are always electrically connected between the input node 102 and the ground 112. As such, when the voltage selection switch 110 is deactivated, i.e., open, the voltage suppressors 200, 202 exhibit a clamping voltage of about 42 V between the input node 102 and the ground 112. However, when the voltage selection switch 110 is activated, i.e., closed, the clamping voltage between the input node 102 and the ground 112 becomes about 22 V, as the second voltage suppressor 202 is bypassed.

Referring now to FIG. 1 or 2, at least one load 116 may be electrically connectable to the input node 102. The electrical system 100 may include at least one load operation switch 118 electrically connected to the at least one load 116 for selectively electrifying the at least one load 116. One load operation switch 118 is shown in each of the figures, implemented as a MOSFET (not separately numbered). The load operation switch 118 may be referred to as a "driver" by those skilled in the art. When disposed between the input node 102 and the load 116, the load operation switch 118 may be referred to as a "high-side driver" by those skilled in the art. Of course, other techniques and devices for implementing the load operation switch 118 may be utilized.

The load 116 may be available from its manufacturer in different versions which require different operating voltages. For example, a manufacturer may supply a load 116 in a 12 V version and a 24 V version. Each of these versions have different voltage suppression needs. The system 100, as further described herein, is configured to provide the different voltage suppression needs for either version of the load 116.

The electrical system 100 may further include a sensor 120. The sensor 120 is electrically connected to the input node 102 and configured to sense a nominal operating voltage at the input node 102. For example, the sensor 120 may detect whether the nominal operating voltage, i.e., the voltage of the power supply 104 is 12 V or 24 V. The sensor 120 may be in communication with the controller 114, such that the sensed voltage is communicated to the controller 114. The controller 114 may then utilize this sensed voltage to determine whether or not to activate the voltage selection switch 110. However, it should be appreciated that the electrical system 100 may be implemented without the sensor 120. For instance, software running in the controller 114 may be programmed at manufacturing or at the point of sale to operate the voltage selection switch 110 based on the installation into a 12 V or 24 V electrical system.

Figure 3:
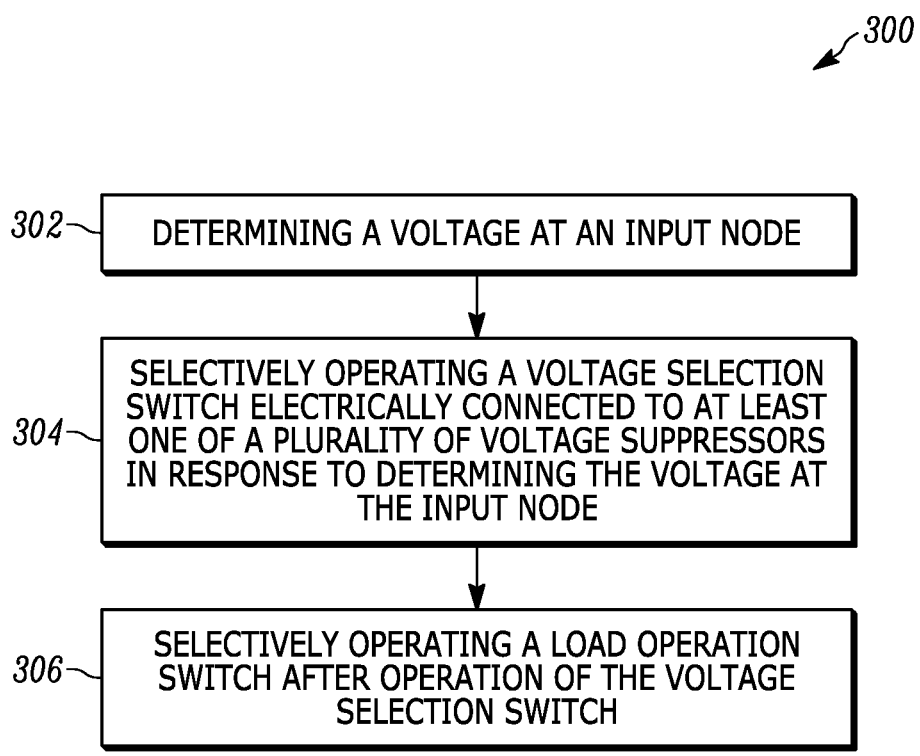
FIG. 3 is a flowchart showing a method of operating the electrical system according to one exemplary embodiment.

Referring now to FIG. 3, a method 300 of operating an electrical system 100 is also disclosed. While the exemplary method 300 describes operation of the electrical system 100 shown in FIGS. 1 and 2 and as described above, it should be appreciated that the method 300 may be utilized on other systems and devices (not shown). Of course, the method 300 may be operated by the controller 114 and/or other processing devices (not shown).

The method 300 includes, at 302, determining a voltage at an input node 102. Determining the voltage at the input node 102 may be accomplished, as described above, by utilizing a sensor 120 and/or by querying the memory 115 in the controller 114 (FIG. 1. The method 300 further includes, at 304, selectively operating a voltage selection switch 110 electrically connected to at least one of a plurality of voltage suppressors 106, 108, 200, 202 in response to determining the voltage at the input node.

The method 300 also may include, at 306, selectively operating a load operation switch 118 after operation of the voltage selection switch 110. As such, electrical power is not transmitted to the load 116 until after the appropriate voltage suppressors 106, 108, 200, 202 are activated (or deactivated) by the voltage selection switch 110.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An electrical system comprising:
   an input node electrically connectable to a power supply;
   a plurality of voltage suppressors;
   one of said plurality of voltage suppressors electrically connected to said input node;
   a voltage selection switch electrically connected to at least one of said plurality of voltage suppressors; and
   a controller in communication with said switch to selectively operate said switch based on a nominal operating voltage at said input node,
   wherein said plurality of voltage suppressors comprises a first voltage suppressor and a second voltage suppressor electrically connected in series between said input node and a ground reference and wherein said voltage selection switch is electrically connected between said ground reference and a node between said voltage suppressors, and
   at least one load operation switch electrically connected between the input node and at least one load of the electrical system, for selectively electrifying the at least one load, the at least one load connected between said at least one load operation switch and said ground reference.

2. The system as set forth in claim 1 wherein said first voltage suppressor and said second voltage suppressor each exhibit a first clamping voltage.

3. The system as set forth in claim 1 further comprising a sensor electrically connected to said input node for sensing a nominal operating voltage at said input node.

4. The system as set forth in claim 3 wherein said controller is in communication with said sensor for receiving the nominal operating voltage sensed by said sensor.

5. The system as set forth in claim 1 wherein said at least one load operation switch is a transistor electrically connected between said input node and said at least one load.

6. The system as set forth in claim 1 wherein at least one of said plurality of voltage suppressors is a diode.

7. The system as set forth in claim 1 wherein said input node is configured to receive a direct current (DC) input from the power supply.

8. The system as set forth in claim 1, wherein the controller is one of a microprocessor, microcontroller, and application specific integrated circuit, and the controller executes instructions stored in memory.

9. The system as set forth in claim 1, wherein said at least one load operation switch and said voltage selection switch are controlled to conduct current simultaneously during operation of the system.

10. The system as set forth in claim 1, wherein the controller activates the at least one load operation switch only after the voltage selection switch is operated by the controller.

11. A method of operating an electrical system, comprising: providing, to an input node of the electrical system, a power supply; providing, to the input node, voltage suppressor circuitry comprising a plurality of voltage suppressors, each voltage suppressor exhibiting a different clamping voltage; determining whether the power supply connected to the input node is a first power supply providing a first predetermined supply voltage or a second power supply providing a second predetermined supply voltage; based upon the determination, selecting a clamping voltage for the input node and for an output node of the electrical system, the selected clamping voltage being a clamping voltage exhibited by one of a first and a second voltage suppressor of the plurality of voltage suppressors, or by a series connection of the first voltage suppressor and the second voltage suppressor; and after selecting a clamping voltage, selectively activating a load operation switch connected between the input node and the output node, such that activating the load operation switch connects the output node to the input node and not activating the load operation switch electrically isolates the output node from the input node, the load operation switch is electrically connected between the input node and a load of the electrical system, wherein the first voltage suppressor is connected to the input node which exhibits a first clamping voltage, and the second voltage suppressor which exhibits a second clamping voltage, and wherein selecting a clamping voltage comprises selectively activating a voltage selection switch connected across one of the first voltage suppressor and the second voltage suppressor.

12. The method of claim 11, wherein when the voltage selection switch is open, the input node is clamped at a sum of the first clamping voltage and the second clamping voltage, and when the voltage selection switch is closed, the input node is clamped at the clamping voltage corresponding to the one of the first voltage suppressor and the second voltage suppressor.

13. The method of claim 11, wherein the first and second power supplies are DC power supplies.

14. The system as set forth in claim 1, wherein the controller includes a first output connected to a control terminal of the voltage selection switch and a second output, separate from the first output, connected to a control terminal of the load operation switch.

15. The method of claim 11, wherein the voltage selection switch is connected across the second voltage suppressor, and the second voltage suppressor is connected between the first voltage suppressor and a ground reference.

16. The method of claim 11, wherein the determining, the selecting, and the selectively activating are performed by a controller, the controller having a first output connected to a control terminal of the voltage selection switch and a second output connected to a control terminal of the load operation switch.

17. The method of claim 11, wherein the first clamping voltage is 22 V, and the second clamping voltage is 20 V.

* * * * *